(12) United States Patent
Wendt et al.

(10) Patent No.: US 11,100,807 B2
(45) Date of Patent: Aug. 24, 2021

(54) METHOD FOR TRANSMITTING PIECES OF INFORMATION BETWEEN VEHICLES OF A VEHICLE PLATOON AND METHOD FOR PROCESSING AN ASSISTANCE REQUEST OUTPUT BY A FIRST VEHICLE OF A VEHICLE PLATOON DURING A LANE CHANGE BY AT LEAST ONE SECOND VEHICLE OF THE VEHICLE PLATOON

(71) Applicant: Robert Bosch GmbH, Stuttgart (DE)

(72) Inventors: Hauke Wendt, Ditzingen (DE); Sergey Chirkov, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 16/373,799

(22) Filed: Apr. 3, 2019

(65) Prior Publication Data

US 2019/0311627 A1 Oct. 10, 2019

(30) Foreign Application Priority Data

Apr. 9, 2018 (DE) .......................... 102018205263.8

(51) Int. Cl.
*G08G 1/16* (2006.01)
*B60W 30/18* (2012.01)
*G05D 1/02* (2020.01)
*G08G 1/00* (2006.01)

(52) U.S. Cl.
CPC ....... *G08G 1/167* (2013.01); *B60W 30/18163* (2013.01); *G05D 1/0289* (2013.01); *G05D 1/0293* (2013.01); *G08G 1/161* (2013.01); *G08G 1/166* (2013.01); *G08G 1/202* (2013.01); *G05D 2201/0213* (2013.01)

(58) Field of Classification Search
CPC ........ G08G 1/167; G08G 1/202; G08G 1/161; G08G 1/166; G08G 1/162; G08G 1/22; B60W 30/18163; G05D 1/0289; G05D 1/0293; G05D 2201/0213; H04L 67/12
See application file for complete search history.

(56) References Cited

U.S. PATENT DOCUMENTS

| 2016/0071418 | A1* | 3/2016 | Oshida ................ B60W 30/165 701/23 |
| 2017/0011633 | A1 | 1/2017 | Boegel |
| 2018/0225970 | A1* | 8/2018 | Mitra ................... G08G 1/0141 |
| 2019/0180629 | A1* | 6/2019 | Kim ....................... G08G 1/162 |

FOREIGN PATENT DOCUMENTS

| DE | 10109046 A1 | 9/2002 |
| DE | 102007024877 A1 | 12/2008 |
| EP | 3091520 A1 | 11/2016 |

* cited by examiner

*Primary Examiner* — Rodney A Butler
(74) *Attorney, Agent, or Firm* — Norton Rose Fulbright US LLP; Gerard Messina

(57) ABSTRACT

A method for transmitting pieces of information between vehicles of a vehicle platoon during a lane change for circumventing an obstacle. A first vehicle of the vehicle platoon checks, in response to an identification of the obstacle, whether an evasive maneuver of the first vehicle into an alternative lane is possible. If the check yields that the evasive maneuver of the first vehicle is not possible, an assistance request is output to a communication interface for communication with at least one second vehicle of the vehicle platoon to prompt the second vehicle to conduct an evasive maneuver into the alternative lane.

12 Claims, 2 Drawing Sheets

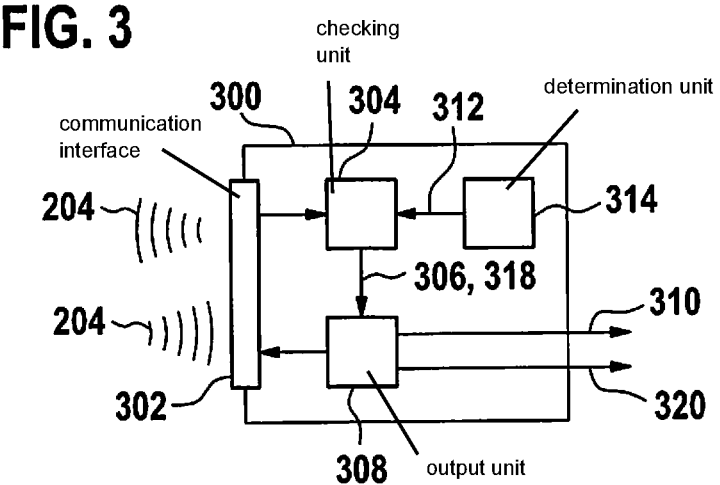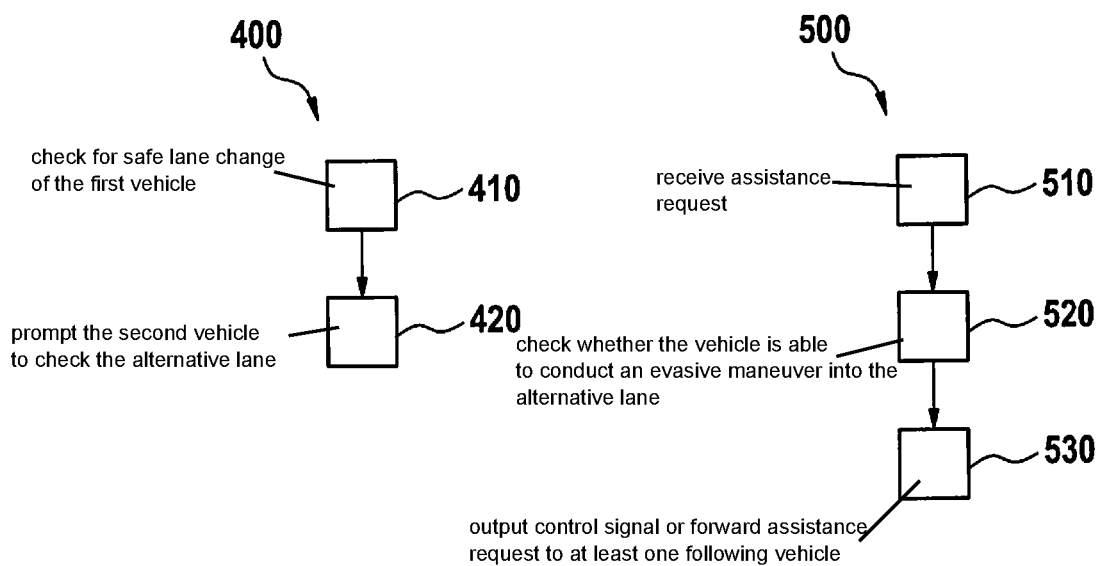

METHOD FOR TRANSMITTING PIECES OF INFORMATION BETWEEN VEHICLES OF A VEHICLE PLATOON AND METHOD FOR PROCESSING AN ASSISTANCE REQUEST OUTPUT BY A FIRST VEHICLE OF A VEHICLE PLATOON DURING A LANE CHANGE BY AT LEAST ONE SECOND VEHICLE OF THE VEHICLE PLATOON

CROSS REFERENCE

The present application claims the benefit under 35 U.S.C. § 119 of German Patent Application No. DE 102018205263.8 filed on Apr. 9, 2018, which is expressly incorporated herein by reference in its entirety.

BACKGROUND INFORMATION

The present invention is directed to a device, a method, a computer program.

During so-called platooning, multiple vehicles drive behind one another at a very small distance in an electronically coupled manner to benefit from the slipstream in terms of fuel consumption. One challenge is the circumnavigation of obstacles, taking interferences by other road users into consideration.

SUMMARY

The present invention provides an example method and an example device for transmitting pieces of information between vehicles of a vehicle platoon during a lane change for circumnavigating an obstacle, a method and a device for processing an assistance request output by a first vehicle of a vehicle platoon during a lane change by at least one second vehicle of the vehicle platoon, and a corresponding computer program. The measures described herein allow advantageous refinements of and improvements on the example device in accordance with the present invention.

The approach described here is based on the finding that an evasive maneuver of a vehicle platoon may be coordinated based on an electronic data exchange between individual vehicles of the vehicle platoon. In particular, an interference-free lane change of the vehicle platoon may thus also be ensured when vehicles not part of the platoon are present on an alternative lane. For this purpose, a prompt may be transmitted by a platoon participant impeded from carrying out an evasive maneuver by a vehicle in the alternative lane to a further platoon participant, such as a following platoon participant, to change the lane. Due to the lane change of the further platoon participant, further vehicles, in particular further vehicles which are not part of the vehicle platoon or do not belong to the vehicle platoon may be prevented from moving up into the alternative lane, so that a sufficiently large gap is created for the vehicles of the vehicle platoon to safely change the lane. In this way, the problem of a collective lane change may be solved in a simple manner in the event of interferences by other road users.

A method for transmitting pieces of information between vehicles of a vehicle platoon during a lane change for circumnavigating an obstacle is described, the method including the following steps:

checking by a first vehicle of the vehicle platoon, in response to an identification of the obstacle, whether an evasive maneuver of the first vehicle into an alternative lane is possible; and outputting an assistance request to a communication interface for the communication with at least one second vehicle of the vehicle platoon to prompt the second vehicle to carry out an evasive maneuver into the alternative lane when the check yields that the evasive maneuver of the first vehicle is not possible.

A vehicle platoon may be understood to mean a (vehicle) convoy or platoon made up of vehicles driving closely behind one another, such as cars, trucks or commercial vehicles. The vehicles may be linked to one another for the coordination of driving maneuvers. An obstacle may be understood to mean a stationary or movable obstacle.

A communication interface may, in particular, be understood to mean an interface for the wireless communication, for example via WLAN or mobile radio, between individual vehicles of the vehicle platoon. A first vehicle may be understood to mean a vehicle leading the vehicle platoon, for example. As an alternative, the first vehicle may be a vehicle driving between two vehicles of the vehicle platoon. A second vehicle may, in particular, be understood to mean a vehicle of the vehicle platoon following the first vehicle. For example, the assistance request may be output when it is identified in the step of checking that the alternative lane is blocked for the first vehicle by one or multiple vehicle(s) not part of the platoon, for example passing vehicles, and thus no lane change is possible for the first vehicle. An alternative lane may be understood to mean an adjoining traffic lane, for example.

According to one specific embodiment, a distance value may be read in a step of reading in, which represents a minimum distance from the obstacle to be adhered to during the lane change. In the step of checking, it may be checked, using the distance value, whether the evasive maneuver of the first vehicle is possible with adherence to the minimum distance. Accordingly, the assistance request may be output in the step of outputting when the check yields that the evasive maneuver of the first vehicle is not possible with adherence to the minimum distance. A minimum distance may be understood to mean a safety distance between the obstacle and a vehicle of the vehicle platoon approaching the obstacle. The minimum distance shall be understood to mean the distance in the direction or along a shared traffic lane of the obstacle and the vehicle. A local boundary may be established by the minimum distance, for example, at which the vehicles of the vehicle platoon are preferably to change the lane. It is possible that the distance value is stored in a memory unit assigned to a vehicle of the vehicle platoon or the vehicle platoon. This specific embodiment allows accidents to be prevented particularly reliably during the lane change of the vehicle platoon.

According to one further specific embodiment, the distance value may be determined in a step of determining as a function of a speed of the first vehicle and/or of the vehicle platoon and/or of the obstacle and/or of an adjoining vehicle on the alternative lane. For example, the distance value may be determined as a function of a relative speed between the vehicle platoon and the obstacle or between the first vehicle and the obstacle as a fixed or dynamic variable. The speed may be an instantaneous or expected speed. It is possible that a distance value is stored for every speed in the memory unit. The speed or a value for the speed may be detected, for example, with the aid of a speed-measuring sensor system. A piece of information about the speed may be transmitted in this process from a vehicle of the vehicle platoon or a vehicle not part of the platoon to a vehicle of the vehicle platoon. This specific embodiment enables a speed-dependent adaptation of the distance value. In this way, the safety of the method may be further enhanced.

According to one further exemplary embodiment, in a step of comparing, a value of a deviation of the speed of the vehicle platoon and/or of the first vehicle may be compared to the speed of the adjoining vehicle using a predefined threshold value. Accordingly, the distance value may be increased in the step of determining when the comparison yields that the value of the deviation is below the threshold value. In this way, the lane change of the vehicle platoon may be accelerated at low speed differences compared to vehicles driving in parallel.

The method may include a step of identifying the second vehicle as a vehicle following the first vehicle. In the step of outputting, the assistance request may be output in response to the identification. In this way it may be ensured that the assistance request is transmitted to a platoon participant following the first vehicle.

The method may furthermore include a step of reducing a speed of the first vehicle when the check yields that the evasive maneuver of the first vehicle is not possible. In this way, the distance between the first vehicle and following vehicles to passing vehicles blocking the alternative lane may be increased. A sufficiently large gap may thus be created for a safe lane change.

Moreover, the method may include a step of checking the communication interface for a presence of a receipt confirmation which confirms a receipt of the assistance request by the second vehicle. The step of outputting may be carried out repeatedly in the process to output the assistance request again when the step of checking, after the expiration of a waiting period, yields that the receipt confirmation is not present. In this way, the robustness of the method against perturbations during the data exchange via the communication interface may be increased.

The approach described here furthermore provides a method for processing an assistance request output by a first vehicle of a vehicle platoon during a lane change by at least one second vehicle of the vehicle platoon, the method including the following steps:

receiving the assistance request by a communication interface for the communication with the first vehicle;

checking, using the assistance request, whether an evasive maneuver of the second vehicle into an alternative lane is possible; and outputting a control signal for steering the second vehicle into the alternative lane when the check yields that the evasive maneuver of the second vehicle is possible, and/or outputting the assistance request to the communication interface to forward the assistance request to at least one following vehicle of the vehicle platoon when the check yields that the evasive maneuver of the second vehicle is not possible.

It is particularly advantageous when the control signal is output in the step of outputting to furthermore change a speed of the second vehicle as a function of a relative speed between the second vehicle and at least one vehicle in the alternative lane. In this way, the distance between the second vehicle and following vehicles of the vehicle platoon to passing vehicles blocking the alternative lane may be increased. A sufficiently large gap may thus be created for a safe lane change.

According to one further specific embodiment, in the step of outputting, furthermore a receipt confirmation may be output to the communication interface in response to the receipt of the assistance request. In this way, it may be ensured in a simple manner that the assistance request has reached the second vehicle.

According to one further specific embodiment, the assistance request may be output in the step of outputting as a function of a number of prior forwarding instances of the assistance request. In this way, the forwarding of the assistance request may be ended after a certain number of forwarding instances. It may thus be avoided that vehicles of the vehicle platoon which are situated at a larger distance from the obstacle are prompted to change the lane.

These methods may be implemented in software or hardware or in a mixed form made up of software and hardware, for example in a control unit.

The approach presented here furthermore creates a device which is designed to carry out, activate or implement the steps of one variant of a method described here in corresponding units. The object underlying the present invention may also be achieved quickly and efficiently by this embodiment variant of the present invention in the form of a device.

The device may be situated in a vehicle of the vehicle platoon or distributed among multiple vehicles of the vehicle platoon. It is also possible that multiple vehicles of the vehicle platoon include similar or identical devices. It is furthermore possible that the device is part of an external processing unit not part of the vehicle, such as of an external server or of a cloud computing system.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EPROM or a magnetic memory unit. The communication interface may be designed to read in or output data wirelessly and/or in a wire-bound manner, a communication interface which is able to read in or output wire-bound data being able to read these data in, for example electrically or optically, from a corresponding data transmission line or output these into a corresponding data transmission line.

A device may presently be understood to mean an electrical device which processes sensor signals and outputs control and/or data signals as a function thereof. The device may include an interface which may be designed as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In one advantageous embodiment, the device carries out a control of the vehicles. For this purpose, the device may access sensor signals, for example, such as acceleration, pressure, steering angle or surroundings sensor signals. The activation takes place via actuators, such as brake or steering actuators, or an engine control unit of the vehicles.

In addition, in accordance with the present invention, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the figures and are described in greater detail below.

BRIEF DESCRIPTION OF THE DRAWINGS

FIG. 3 shows a schematic representation of a device according to one exemplary embodiment.

FIG. 4 shows a flow chart of a method for transmitting pieces of information according to one exemplary embodiment.

FIG. 5 shows a flow chart of a method for processing an assistance request according to one exemplary embodiment.

DETAILED DESCRIPTION OF EXAMPLE EMBODIMENTS

Figure 1:
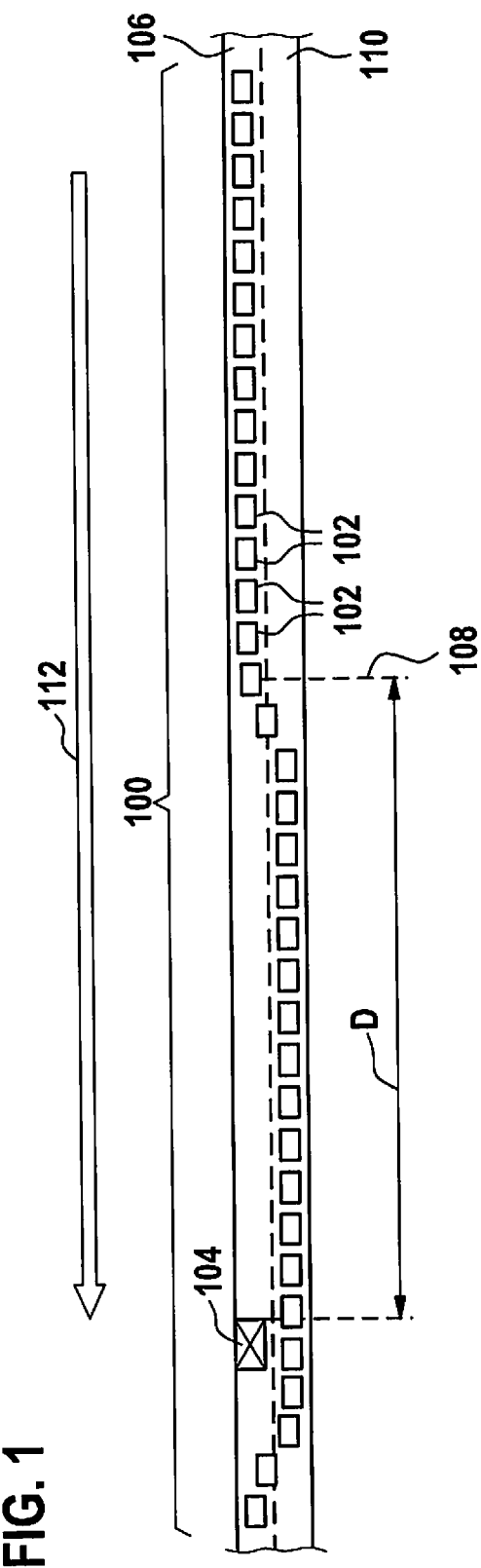
FIG. 1 shows a schematic representation of a vehicle platoon during the lane change without interfering vehicles.

In the following description of favorable exemplary embodiments of the present invention, identical or similar reference numerals are used for similarly acting elements shown in the different figures, and a repeated description of these elements is dispensed with.

FIG. 1 shows a schematic representation of a vehicle platoon 100 during a lane change without interfering vehicles. Vehicle platoon 100 includes a multitude of vehicles 102 following closely behind one another and linked to one another, which are each designed to circumnavigate an obstacle 104 on an instantaneous traffic lane 106 of vehicle platoon 100, taking a minimum distance D from obstacle 104 into consideration. For this purpose, vehicles 102 consecutively conduct an evasive maneuver into an alternative lane 110, which is not experiencing traffic here, when a local boundary 108 predefined by minimum distance D has been reached. After passing obstacle 104, vehicles 102 move back into their original traffic lane 106. A driving direction of vehicle platoon 100 is denoted by an arrow 112.

Figure 2:
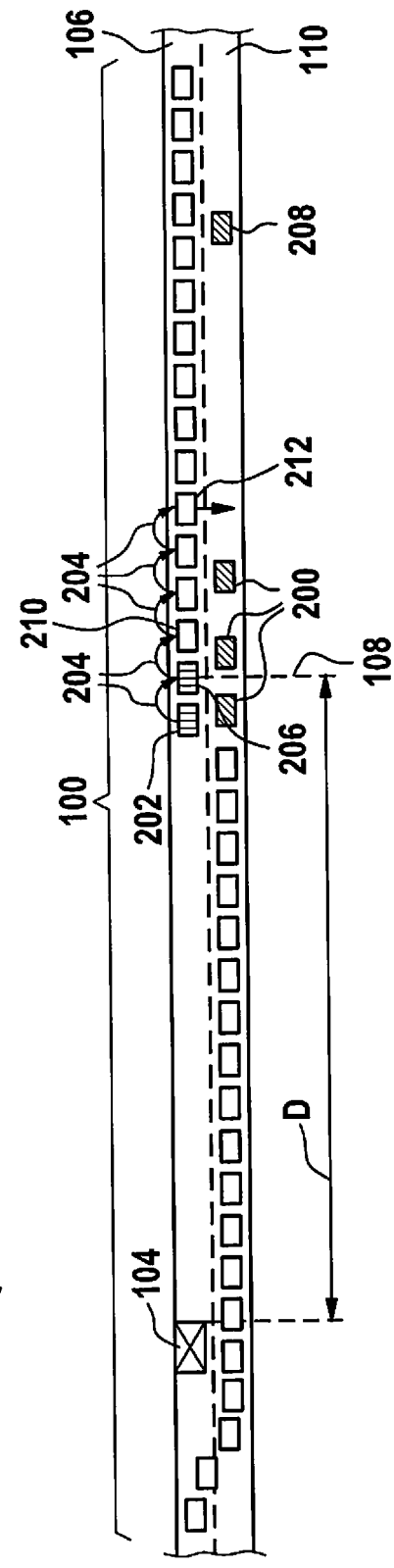
FIG. 2 shows a schematic representation of the vehicle platoon from FIG. 1 during the lane change with the aid of methods according to exemplary embodiments.

FIG. 2 shows a schematic representation of vehicle platoon 100 from FIG. 1 during the lane change with the aid of methods according to exemplary embodiments of the present invention. In contrast to FIG. 1, alternative lane 110 is partially blocked by a multitude of passing vehicles 200 here. A first vehicle 202 of vehicle platoon 100 is thus blocked from carrying out an evasive maneuver by vehicles 200 upon reaching boundary 108. To nonetheless ensure a safe lane change of vehicle platoon 100, first vehicle 202 is designed to emit an assistance request 204 to a following second vehicle 206 of vehicle platoon 100 in response to an identification of blocked alternative lane 110. Assistance request 204 prompts second vehicle 206 to conduct an evasive maneuver into alternative lane 110, for example to prevent a vehicle 208 approaching on alternative lane 110 from moving up quickly. Specifically, instantaneously blocking vehicles 200 are to be able to conduct an evasive maneuver since otherwise there would not even be sufficient room for the presently blocked vehicles.

For this purpose, second vehicle 206 checks, using assistance request 204, whether alternative lane 110 is clear for a lane change. By way of example, this is not the case according to FIG. 2 since second vehicle 206 and first vehicle 202 are prevented from conducting an evasive maneuver by passing vehicles 200. Accordingly, second vehicle 206 is designed to forward assistance request 204 to a third vehicle 210 of vehicle platoon 100, which, in turn, checks the option of conducting an evasive maneuver into alternative lane 110, using assistance request 204. According to one exemplary embodiment, assistance request 204 is forwarded via individual vehicles of vehicle platoon 100 until it is received by a vehicle which is able to change to alternative lane 110 without interference. According to FIG. 2, the forwarding of assistance request 204 ends with a further vehicle 212 of vehicle platoon 100 which, in contrast to vehicles 202, 206, 210, has a sufficiently large gap for carrying out the lane change.

Further vehicle 212 is designed, for example, to reduce its speed in a suitable manner prior to or after the lane change so that passing vehicles 200 are able to pass preferably quickly, and a sufficiently large gap for the lane change for following vehicles of vehicle platoon 100 is created.

According to one exemplary embodiment, the vehicles of vehicle platoon 100 are designed to check, using assistance request 204, whether the evasive maneuver into alternative lane 110 is possible while adhering to minimum distance D, i.e., prior to reaching boundary 108. According to FIG. 2, it is only possible for further vehicle 212 to still change to alternative lane 110 prior to reaching boundary 108. Vehicles of vehicle platoon 100 which have passed boundary 108 without changing the lane are shown in a perpendicularly hatched manner in FIG. 2.

Different exemplary embodiments of the approach described here are described again hereafter in other words.

If obstacle 104 on traffic lane 106 of vehicle platoon 100 is detected in a timely manner, the evasive maneuver may be planned differently than in an emergency. Minimum distance D is established or calculated, at which the vehicles of vehicle platoon 100 are to change traffic lanes. In the case of stationary obstacles and a fixed setpoint speed of vehicle platoon 100, for example, a fixed variable is determined. If obstacle 104 is a very slow vehicle or if the speed of vehicle platoon 100 is variable, in contrast, a dynamically calculated variable is selected as minimum distance D, for example. The dynamically calculated variable is determined, in particular, as a function of a difference between a speed of vehicle platoon 100 and an instantaneous or previously calculated speed of obstacle 104, such as a very heavy transport vehicle on a steep hill.

If it is not possible for a vehicle of vehicle platoon 100 to change the lane after reaching boundary 108, in particular, for example, due to another vehicle on the particular alternative lane 110, as is shown in FIG. 2 by way of example, following vehicles of vehicle platoon 100 are prompted to assist based on a corresponding data exchange. For this purpose, vehicle 212 driving further toward the rear conducts an evasive maneuver prior to reaching boundary 108 and creates space by keeping vehicle 208 approaching from behind out of the lane. As soon as a vehicle of vehicle platoon 100 beyond boundary 108 was not able to change the lane, the next following vehicle of vehicle platoon 100 for which a lane change is possible prior to reaching boundary 108 changes to alternative lane 110.

To create the space in alternative lane 110 necessary for the lane change, the platoon portion starting from first interfered vehicle 202 should reduce its speed. Interfering vehicles 200 require space and also a larger safety distance than the vehicles of vehicle platoon 100.

According to one exemplary embodiment, first vehicle 202 is designed to reduce its speed in a suitable manner in response to the identification of the blocked alternative lane 110. In this way, the vehicles following first vehicle 202 also automatically drive more slowly, without a specific communication between the vehicles being necessary for this purpose. The prerequisite here is that the vehicles of vehicle platoon 100 do not pass one another during the lane change maneuver.

When the interference has been eliminated by allowing vehicles 200 to pass, the rest of vehicle platoon 100 adapts its speed again to the predefined setpoint speed.

As soon as the vehicles of vehicle platoon 100 merge to the right after passing obstacle 104, additional space is created in the areas where interfering vehicles were driving on alternative lane 110. These gaps are closed in that the vehicles of the vehicle platoon 100 adjust their distances again.

FIG. 3 shows a schematic representation of a device 300 according to one exemplary embodiment. Device 300 is designed for carrying out the methods described above based on FIG. 2, for example. As an alternative, the described methods are each executable with the aid of a dedicated device. Device 300 is integrated into each vehicle of the vehicle platoon, for example.

Hereafter, the function of transmitting pieces of information between vehicles of a vehicle platoon with the aid of device 300 is described based on the example of first vehicle 202 from FIG. 2.

Device 300 includes a communication interface 302 for the communication with other vehicles of the vehicle platoon. A checking unit 304 is designed to check, in response to the identification of the obstacle, whether the evasive maneuver of the first vehicle into the alternative lane is possible. As a result of the check, checking unit 304 outputs a corresponding check result 306, for example a yes/no signal. An output unit 308 is designed to read in and evaluate check result 306 from checking unit 304. If the evaluation yields that the evasive maneuver of the first vehicle is not possible, output unit 308 generates assistance request 204 and outputs it via communication interface 302 to the second vehicle. The output of assistance request 204 takes place, for example, on condition that the second vehicle was identified as a vehicle following the first vehicle, in particular a directly following vehicle.

According to one exemplary embodiment, output unit 308 is designed to output a speed signal 310 for reducing a speed of the first vehicle, in addition to assistance request 204, if an evasive maneuver is not possible. This takes place, in particular, with the objective of increasing a relative speed of the first vehicle relative to the vehicles blocking the alternative lane in a suitable manner, and to thereby create a sufficiently large gap for the lane change of the vehicle platoon. In particular, without delay, no relative speed or an increase or a decrease in the distance would exist. The portion of the platoon not experiencing interference has a consistent travel speed, and an interfering vehicle follows behind.

According to one exemplary embodiment, checking unit 304 is designed to check the option for an evasive maneuver additionally using a distance value 312, which represents the minimum distance from the obstacle to be adhered to by the first vehicle. For example, checking unit 304 outputs a negative check result 306 when the check yields that the first vehicle is not able to conduct an evasive maneuver into the alternative lane prior to the local boundary defined by the minimum distance.

According to one exemplary embodiment, device 300 includes a determination unit 314 for determining distance value 312 as a function of a relative speed of the first vehicle or of the vehicle platoon relative to the obstacle or to the passing vehicles on the alternative lane. In particular, determination unit 314 is designed to select distance value 312 accordingly larger at a lower relative speed.

According to one exemplary embodiment, output unit 308 is designed to check communication interface 302 for the presence of a receipt confirmation in response to the output of assistance request 204 during a certain read-out duration. The receipt confirmation is a piece of information output by the second vehicle in response to a successful receipt of assistance request 204, for example. If output unit 308 does not read in a receipt confirmation within the read-out duration, it outputs assistance request 204 again via communication interface 302 to the second vehicle. For example, output unit 308 is designed to output assistance request 204 again multiple times if the receipt confirmation is not present. As an alternative, output unit 308 is designed to output assistance request 204 to a vehicle of the vehicle platoon following the second vehicle when the transmission of assistance request 204 to the second vehicle was repeatedly not confirmed.

Hereafter, the function of processing assistance request 204 with the aid of device 300 is described based on the example of second vehicle 210 driving behind the first vehicle from FIG. 2.

In response to the receipt of assistance request 204, checking unit 304 checks whether or not the second vehicle is able to conduct an evasive maneuver into the alternative lane. The check is carried out, for example, analogously to the above-described method, additionally using distance value 312. Corresponding to a result of the check, checking unit 304 outputs a further check result 318. If further check result 318 indicates that the evasive maneuver is possible, output unit 308, using further check result 318, outputs a control signal 320 for steering the second vehicle into the alternative lane, for example by appropriately activating actuators or control units for controlling the engine, braking and steering system of the second vehicle. It is particularly advantageous when, with the aid of control signal 320, additionally the speed of the second vehicle is reduced in such a way that its relative speed with respect to the vehicles blocking the alternative lane increases decisively. The use of a dynamic change distance, however, is not necessary for this second vehicle. The change inquiry from the preceding vehicle, after all, is already present. When the lane change is safely possible, it can be carried out in a simple manner.

If, in contrast, further check result 318 indicates that the evasive maneuver is not possible or is not possible prior to reaching the local boundary ahead of the obstacle defined by distance value 312, output unit 308 forwards assistance request 204 via communication interface 302 to a following vehicle of the vehicle platoon to prompt it to change lanes in an analogous manner.

FIG. 4 shows a flow chart of a method 400 for transmitting pieces of information between vehicles of a vehicle platoon during a lane change according to one exemplary embodiment. Method 400 is executable with the aid of the device described above based on FIG. 3, for example. In a first step 410, it is initially checked, in response to the identification of the obstacle, whether the alternative lane offers sufficient space for a safe lane change of the first vehicle. If this is not the case, the assistance request is output to the communication interface in a step 420 to prompt the second vehicle to check the option of changing to the alternative lane.

FIG. 5 shows a flow chart of a method 500 for processing an assistance request according to one exemplary embodiment. Method 500 is executable with the aid of the device described above based on FIG. 3, for example. Initially, the assistance request is received by the communication interface in a step 510. In a further step 520, it is checked, using the assistance request, whether the vehicle receiving the assistance request is able to conduct an evasive maneuver into the alternative lane. If it is established in step 520 that the evasive maneuver is possible, a corresponding control signal for steering the particular vehicle into the alternative lane is output in a step 530. As an alternative, in step 530 the assistance request, instead of the control signal, is forwarded via the communication interface to at least one following vehicle of the vehicle platoon if it is established in step 520 that the evasive maneuver is not possible. The forwarding of the assistance request takes place optionally, taking a number of prior forwarding instances of the assistance request into consideration.

According to one exemplary embodiment, in step 530, in response to the receipt of the assistance request in step 510, additionally a corresponding receipt confirmation is output to the communication interface to confirm the successful transmission of the assistance request to the vehicle sending the assistance request.

Different exemplary embodiments of the approach presented here are described again hereafter in other words.

In both methods 400, 500, a simple technique is used, which allows very long, and in particular infinitely long, vehicle platoons at a low data exchange volume. The prerequisite is a known local sequence of the vehicles in the vehicle platoon. For this purpose, a vehicle only has to know the identity of the following vehicle.

A platoon participant impeded from changing lanes sends a help request to the following platoon participants. The receiving platoon participant thereupon sends a receipt confirmation. If the delay is too long, the inquirer repeats the inquiry. Upon receipt of the confirmation, the inquirer no longer requires further information with respect to the change process.

The receiving platoon participants now checks whether he himself or she herself is able to change the lane. This includes the ability to change and an option to change the lane. If yes, he or she changes lanes, and no further specific communication is required. If not, the platoon participant forwards the request to a following platoon participant. The method is the same here.

The end of a vehicle platoon represents a special case. In this case, the inquiry is not forwarded.

Optionally, a range limitation is introduced for infinitely long platoons of vehicles. This is implemented, for example, via a forwarding counter which is decremented in the case of an inquiry with every forwarding. As soon as 0 has been reached, forwarding no longer takes place. The benefit is that platoon participants situated at an arbitrary distance from the obstacle do not change the lane when traffic is dense or congested.

The obstacle identification takes place, for example, via the infrastructure, i.e., via traffic telematics, also referred to as intelligent transport system or ITS for short, or via a platoon participant. The sequence of the vehicles in the vehicle platoon is ascertained by exchanging GPS data, for example.

Distance D is fixedly predefined, for example, such as via standardization. However, it is not necessary that all platoon participants actually use the same definition of D. For example, each platoon participant uses his or her dedicated distance D since the algorithm functions independently therefrom.

Optionally, a comparison, for example of a minimum, a maximum or mean value, is possible via a platoon coordinator. He or she directly establishes the value, for example personally, without comparison.

Moreover, the entire coordination of the obstacle change optionally takes place centrally by the platoon coordinator.

Vehicles passing with a low differential speed are optionally treated as special cases. If the speed difference between a passing, and thus interfering, vehicle is very small, the change threshold is moved up compared to distance D, i.e., increased, for example. This is helpful in having more vehicles change the lane at the right time since a lane change would be blocked for a relatively long time due to the low speed difference in the vicinity of the normal change location.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method of a vehicle platoon that is traveling in a travel direction, for controlling a leading vehicle of the vehicle platoon to perform a lane change for circumventing an obstacle, the method comprising:
   a sensor system of the leading vehicle of the vehicle platoon detecting presence of the obstacle;
   a processor of the leading vehicle:
      determining that the leading vehicle is to be shifted into a particular alternative lane based on the detection of the presence of the obstacle;
      using the sensor system of the leading vehicle to determine that the leading vehicle is unable to perform the determined shift into the particular alternative lane; and
      responsive to the determination of the inability to perform the determined shift, outputting an assistance request, via a communication interface of the leading vehicle, to a first following vehicle of the vehicle platoon that follows the leading vehicle;
   responsive to the assistance request, a respective one of the first following vehicle and another following vehicle of the vehicle platoon that is, with respect to the traveling direction, behind the first following vehicle:
      determining that the respective vehicle is able to shift into the same particular alternative lane into which the leading vehicle is to be shifted; and
      based on the determination that the respective vehicle is able to shift into the same particular alternative lane into which the leading vehicle is to be shifted, performing:
         a drive and steering control by which the respective vehicle shifts into the same particular alternative lane; and
         subsequent to the shift of the respective vehicle, a braking operation to create for the leading vehicle a road clearance section in the alternative lane; and in response to the creation of the road clearance section, the leading vehicle performing a drive and steering control by which the leading vehicle shifts into the road clearance section of the alternative lane.

2. The method as recited in claim 1, further comprising: determining a distance value which represents a minimum distance to the obstacle to be adhered to during the lane change, wherein the determination that the leading vehicle is unable to perform the determined shift includes determining, using the distance value, that the determined shift cannot be performed with adherence to the minimum distance.

3. The method as recited in claim 2, wherein the determination of the distance value is performed as a function of a speed of the leading vehicle and/or of the vehicle platoon and/or of the obstacle and/or of an adjoining vehicle in the alternative lane.

4. A method of a leading vehicle of a vehicle platoon to perform a lane change, the method comprising:
  a sensor system of the leading vehicle detecting presence of an obstacle;
  a processor of the leading vehicle:
    responsive to the detection of the presence of the obstacle, determining that the leading vehicle is to shift into an alternative lane;
    determining a minimum distance to the obstacle to be adhered to during the shift into the alternative lane by:
      obtaining a speed of an adjoining vehicle in the alternative lane and (a) a speed of the vehicle platoon and/or (b) a speed of the leading vehicle; and
      comparing a value of a deviation of the speed of the vehicle platoon and/or of the leading vehicle from a speed of the adjoining vehicle to a predefined threshold value, wherein the distance value is increased when the comparison yields that a value of the deviation drops below the threshold value;
    using the sensor system to determine that the leading vehicle is currently unable to perform the shift into the alternative lane with adherence to the determined minimum distance;
    responsive to the determination that the leading vehicle is currently unable to perform the shift, outputting, via a communication interface of the leading vehicle, an assistance request to at least one following vehicle of the vehicle platoon that is behind the leading vehicle with respect to a traveling direction of the vehicle platoon; and
    in response to creation of a road clearance section in the alternative lane by the at least one following vehicle performing a lane change into the alternative lane in response to the assistance request, performing a drive and steering control of the leading vehicle that shifts the leading vehicle into the road clearance section.

5. The method as recited in claim 1, further comprising: reducing a speed of the leading vehicle in response to the determination of the inability to perform the determined shift.

6. The method as recited in claim 1, further comprising: the leading vehicle checking the communication interface for a presence of a receipt confirmation which confirms a receipt of the assistance request by the first following vehicle, wherein the outputting step is carried out repeatedly to output the assistance request again when the checking step, after expiration of a waiting period, yields that the receipt confirmation is not present.

7. The method as recited in claim 1, further comprising: responsive to the assistance request, the first following vehicle determining whether the first following vehicle is able to shift into the particular alternative lane; and response to a negative result of the determination by the first following vehicle of whether the first following vehicle is able to shift into the particular alternative lane, the first following vehicle forwarding the assistance request to the other following vehicle that is behind the first following vehicle, wherein the other following vehicle creates the road clearance section for the leading vehicle in response to the assistance request received from the first following vehicle.

8. The method as recited in claim 1, wherein the method, including the shift of the respective vehicle, is performed without a determination of a potential collision between the respective vehicle and any vehicle behind which the respective vehicle is traveling.

9. The method as recited in claim 1, wherein the respective vehicle performs the drive and steering control and the braking operation based on a determination by the vehicle platoon that a vehicle that is not part of the vehicle platoon is traveling in the particular alternative lane at a position that is, with respect to the traveling direction, behind the respective vehicle.

10. A vehicle platoon that is traveling in a travel direction, the vehicle platoon comprising:
  a leading vehicle that includes a sensor system, a communication interface, and a processor; and
  at least one following vehicle that is, with respect to a traveling direction of the leading vehicle, behind the leading vehicle, wherein the vehicle platoon is configured to perform a control by which the leading vehicle changes lanes for circumventing an obstacle, the control comprising:
    the sensor system of the leading vehicle detecting presence of the obstacle;
    the processor of the leading vehicle:
      determining that the leading vehicle is to be shifted into a particular alternative lane based on the detection of the presence of the obstacle;
      using the sensor system of the leading vehicle to determine that the leading vehicle is unable to perform the determined shift into the particular alternative lane; and
      responsive to the determination of the inability to perform the determined shift, outputting an assistance request, via a communication interface of the leading vehicle, to a first following vehicle of the at least one following vehicle;
    responsive to the assistance request, a respective one of the first following vehicle and another of the at least one following vehicle:
      determining that the respective vehicle is able to shift into the same particular alternative lane into which the leading vehicle is to be shifted; and
      based on the determination that the respective vehicle is able to shift into the same particular alternative lane into which the leading vehicle is to be shifted, performing:
        a drive and steering control by which the respective vehicle shifts into the same particular alternative lane; and subsequent to the shift of the respective vehicle, a braking operation to create for the leading vehicle a road clearance section in the alternative lane; and in response to the creation of the road clearance section, the leading vehicle performing a drive and steering control by which the leading vehicle shifts into the road clearance section of the alternative lane.

11. A non-transitory computer-readable medium on which are stored instructions that are executable by a processor of a leading vehicle of a vehicle platoon and that, when executed by the processor, cause the processor to perform a method by which to change a lane of the leading vehicle, the method comprising:

using a sensor system of the leading vehicle to detect presence of an obstacle;

responsive to the detection of the presence of the obstacle, determining that the leading vehicle is to shift into an alternative lane;

determining a minimum distance to the obstacle to be adhered to during the shift into the alternative lane by:

obtaining a speed of an adjoining vehicle in the alternative lane and (a) a speed of the vehicle platoon and/or (b) a speed of the leading vehicle; and comparing a value of a deviation of the speed of the vehicle platoon and/or of the leading vehicle from a speed of the adjoining vehicle to a predefined threshold value, wherein the distance value is increased when the comparison yields that a value of the deviation drops below the threshold value;

using the sensor system to determine that the leading vehicle is currently unable to perform the shift into the alternative lane with adherence to the determined minimum distance;

responsive to the determination that the leading vehicle is currently unable to perform the shift, outputting, via a communication interface of the leading vehicle, an assistance request to at least one following vehicle of the vehicle platoon that is behind the leading vehicle with respect to a traveling direction of the vehicle platoon; and in response to creation of a road clearance section in the alternative lane by the at least one following vehicle performing a lane change into the alternative lane in response to the assistance request, performing a drive and steering control of the leading vehicle that shifts the leading vehicle into the road clearance section.

12. A leading vehicle of a vehicle platoon comprising:
a sensor system;
a communication interface; and
a processor, wherein the processor is configured to perform a method by which to change a lane of the leading vehicle, the method comprising:

using a sensor system of the leading vehicle to detect presence of an obstacle;

responsive to the detection of the presence of the obstacle, determining that the leading vehicle is to shift into an alternative lane;

determining a minimum distance to the obstacle to be adhered to during the shift into the alternative lane by:

obtaining a speed of an adjoining vehicle in the alternative lane and (a) a speed of the vehicle platoon and/or (b) a speed of the leading vehicle; and comparing a value of a deviation of the speed of the vehicle platoon and/or of the leading vehicle from a speed of the adjoining vehicle to a predefined threshold value, wherein the distance value is increased when the comparison yields that a value of the deviation drops below the threshold value;

using the sensor system to determine that the leading vehicle is currently unable to perform the shift into the alternative lane with adherence to the determined minimum distance;

responsive to the determination that the leading vehicle is currently unable to perform the shift, outputting, via a communication interface of the leading vehicle, an assistance request to at least one following vehicle of the vehicle platoon that is behind the leading vehicle with respect to a traveling direction of the vehicle platoon; and in response to creation of a road clearance section in the alternative lane by the at least one following vehicle performing a lane change into the alternative lane in response to the assistance request, performing a drive and steering control of the leading vehicle that shifts the leading vehicle into the road clearance section.

* * * * *